(12) United States Patent
Galloway

(10) Patent No.: US 6,187,465 B1
(45) Date of Patent: Feb. 13, 2001

(54) PROCESS AND SYSTEM FOR CONVERTING CARBONACEOUS FEEDSTOCKS INTO ENERGY WITHOUT GREENHOUSE GAS EMISSIONS

(76) Inventor: Terry R. Galloway, 6810 Sherwick Dr., Berkeley, CA (US) 94705-1744

( * ) Notice: Under 35 U.S.C. 154(b), the term of this patent shall be extended for 0 days.

(21) Appl. No.: 09/186,766

(22) Filed: Nov. 5, 1998

Related U.S. Application Data

(60) Provisional application No. 60/064,692, filed on Nov. 7, 1997.

(51) Int. Cl.$^7$ .................................................. H01M 8/06
(52) U.S. Cl. .............................................. 429/17; 429/19
(58) Field of Search ................................. 429/17, 19, 20

(56) References Cited

U.S. PATENT DOCUMENTS

| | | | |
|---|---|---|---|
| 4,473,622 | * 9/1984 | Chludzinski et al. | 429/19 |
| 5,068,159 | * 11/1991 | Kinoshita | 429/17 X |
| 5,248,566 | * 9/1993 | Kumar et al. | 429/19 |
| 5,616,430 | * 4/1997 | Aoyama et al. | 429/17 |
| 5,866,090 | * 2/1999 | Nakagawa | 429/17 X |
| 5,985,474 | * 11/1999 | Chen et al. | 429/17 |

FOREIGN PATENT DOCUMENTS 60-177571 * 9/1985 (JP) .

OTHER PUBLICATIONS

Aresta, et al., "Carbon Dioxide: A Substitute for Phosgene," Chem Tech. pp. 32–40, Mar., 1997.
Hileman, "Industry Considers CO2 Reduction Methods," Chem & Engr News, p. 30, Jun. 1997.
Caruana, "Fuel Cells Poised to Provide Power," Chem. Eng. Prog., pp. 11–21, Sep., 1996.
Eilers, et al., "The Shell Middle Distillate Synthesis Process (SMDS)," J.C. Baltzer A.G., Scientific Publishing Company, Catalysis Letters 7, pp. 253–269, 1990. (Month unknown).
"The Shell Middle Distillate Synthesis Process (SMDS),"— J. Eilers, S.A. Posthuma, AIChe Spring National Meeting, Mar. 18–22, 1990.
"Advances of Tubular Solid Oxide Fuel Cell Technology",—S.C. Singhal, Westinghouse Electric Corporation, 1995 (Month unknown).
"A New Concept for a Lower Cost Coal to Methanol Plant," T.R. Galloway, W.T. Atkins, G.E. Pack, M.B. Psacoo, Advanced Energy Conversion Division, Mittelhauser Corp.—17$^{th}$ IECEC.
"Conversion of Natural Gas to Transportation Fuels Via the Shell Middle Distillate Synthesis Process," (SMDS), V.M.H. Van Wechem, Shell International Petroleum & M.G. G Senden, Koninklijke/Shell. 1994, (Month unknown).
"Texaco Gasification Process," Terry R. Galloway, SEG– California. (Date unknown).

(List continued on next page.)

*Primary Examiner*—Stephen Kalafut
(74) *Attorney, Agent, or Firm*—Coudert Brothers

(57) ABSTRACT

The process and system of the invention converts carbonaceous feedstock from fossil fuels and other combustible materials into electrical energy without the production of unwanted greenhouse emissions. The process and system uses a combination of a gasifier to convert the carbonaceous feedstock and a greenhouse gas stream into a synthesis gas comprising carbon monoxide and hydrogen. One portion of the synthesis gas from the gasifier becomes electrochemically oxidized in an electricity-producing fuel cell into an exit gas comprising carbon dioxide and water. The latter is recycled back to the gasifier after the water is condensed out. The second portion of the synthesis gas from the gasifier is converted into useful hydrocarbon products.

48 Claims, 3 Drawing Sheets

OTHER PUBLICATIONS

"Texaco Gasification Process," Texaco Gasification Process, EPA Site Technology Capsule. Apr. 1995.

"Memo from P.L. Zuideveld," ORTTG/5, Shell International Oil Products B.V. Oct. 1997.

"Breakthrough Technology for Highest Efficiency Power Generation," SOFC Solid Oxide Fuel Cell, Westinghouse Corporation (and attached description—letter dated Jul. 16, 1997).

"Solid Oxide Fuel Cell/Gas Turbine Power Plant Cycles and Performance Estimates," Wayne L. Lundberg, Power–Gen International '96, Dec. 4–6, 1996. Lun Ludnlkj.

"Lurgi Gas Production Technology: The Shell Gasification Process," Lurgi O1 Gas Chemie GmbH. (Date unknown).

"Clean, Green and Competitive Coal Gasification Comes of Age," Clement B. Malin, Texaco. (Date unknown).

"Gasification, Reliable, Efficient and Clean," Texaco Global Gas and Power. (Date unknown).

"Texaco Gasification Process," Texaco Development Corporation. (Date unknown).

"Texaco's Advanced Coal Gasification Technology in China for the Production of Fertilizers," E.A. Reich, Texaco Development Corporation, IFA Production and International Trade Committee Meeting, Sep. 14–15, 1995.

"Optimizing/Costing Study for a 500 MW IGCC Power Plant based on the Shell Gasification Process," W. Liebner, Lurgi O1—Gas—Chemie Gmbh. (Date unknown).

"The Shell Gasification Process for Conversion of Heavy Residues to Hydrogen and Power," Gasification Technologies Conference, Oct. 2–4, 1996.

* cited by examiner

PROCESS AND SYSTEM FOR CONVERTING CARBONACEOUS FEEDSTOCKS INTO ENERGY WITHOUT GREENHOUSE GAS EMISSIONS

This application claims the benefit of prior U.S. provisional application Serial No. 60/064,692 filed Nov. 7, 1997.

This invention relates generally to a process and system for the elimination of carbon dioxide and other greenhouse gas emissions from conventional coal, oil, and natural gas power plants.

BACKGROUND OF THE INVENTION

The burning of fossil fuels in boilers to raise high temperature, high pressure steam that can be used to power turbo-electric generators produces a problem source of carbon dioxide and other greenhouse gases, e.g. methane, ozone and fluorocarbons. This fossil fuel combustion, especially of coal, needs a technological fix to avoid the emission of carbon dioxide and other greenhouse gases with their attendant undesirable release to the earth's atmosphere resulting in the absorption of solar radiation known as the greenhouse effect. Much of the world depends on coal for power. There have been significant efforts to develop clean coal technologies to greatly reduce the release of acid gases, such as sulfur oxides and nitrogen oxides. However, to date none of these clean coal programs aim to eliminate the emissions of carbon dioxide and other greenhouse gases. Efforts to use pure oxygen in power plants and gasification systems to avoid the diluting effects of nitrogen and to achieve higher efficiency suffers from the unacceptable cost of requiring an air separation plant and the problems of excessive temperatures in oxygen-fed turbo-generators.

There is also widespread effort to increase the efficiency of power plants by utilizing advanced thermodynamic combined cycles, more efficient turbo-generators, improved condensers and cooling towers, and similar systems. A small portion of this effort involves the use of fossil fuel gasification processes, which are higher efficiency because they avoid combustion and large combustion product emissions. Finally there is an effort by Westinghouse (Corporate literature, "SureCell®" 1996) and others to combine the use of advanced high temperature turbo-generators and fuel cells to accomplish conversion to electricity at about 70% instead of current conventional power plants of about 47%.

Today there is worldwide concern that the atmospheric buildup of carbon dioxide and other greenhouse gases will start to have serious environmental consequences for the earth's tropospheric temperature, global rainfall distribution, water balance, severe weather storms, and similar consequences. Technological solutions are being demanded throughout the world.

The worldwide research establishment, encouraged by government funding from various agencies, continues to be focused on identifying commercially attractive gas separation technologies to remove carbon dioxide from stack gases and also attractive chemistry that will utilize this carbon dioxide as a raw material to manufacture useful products. This has, indeed, been a very large challenge with poor successes as summarized by the review papers; see Michele Aresta, and Eugenio Quaranta, "*Carbon Dioxide: A Substitute for Phosgene*," Chem.Tech. pp. 32–40, March 1997. and Bette Hileman, "*Industry Considers $CO_2$ Reduction Methods*", Chem & Engr. News, pg. 30, Jun. 30, 1997. Trying to scrub the $CO_2$ from stack gases and trying to chemically react the recovered $CO_2$ clearly is not the right path of research because of the technical difficulty and the process expense of reacting carbon dioxide.

SUMMARY OF THE INVENTION

The process and system of the invention converts carbonaceous feedstock from fossil fuels and other combustible materials into energy without the production of unwanted greenhouse emissions. The present process comprises the following steps:
 (a) converting a carbonaceous feedstock and a greenhouse gas stream in a gasification unit to synthesis gas comprising carbon monoxide and hydrogen;
 (b) electrochemically oxidizing at least a portion of the synthesis gas from the gasification unit in a first half-cell of a fuel cell to produce a first half-cell exit gas comprising carbon dioxide and water;
 (c) recovering the carbon dioxide from the first half-cell exit gas to serve as at least a portion of the greenhouse gas stream in step (a); and
 (d) electrochemically reducing an oxygen-containing gas in a second half-cell of the fuel cell completing the circuit and resulting in the production of electrical energy.

The present system comprises the following:
 (a) the gasification unit having inlet means for the carbonaceous feedstock and the greenhouse gas stream, a catalyst or other means for converting the combined feedstock into the synthesis gas;
 (b) the fuel cell for the production of electrical energy comprising the first half-cell having an inlet in fluid communication with the synthesis gas and a first means or anode for electrochemically oxidizing synthesis gas into the first half-cell exit gas, a second half-cell having a second means or cathode for electrochemically reducing the oxygen-containing gas, and a membrane separating the first and second half cells that will not allow passage of the gaseous components from the respective half-cells; and
 (c) passage means for passing the carbon dioxide from the first half-cell to serve as at least a portion of the greenhouse gas stream for the gasification unit.

The present process avoids the difficult path of attempting to strip and capture the carbon dioxide from stack gases and without attempting to carry out separate chemical reactions of carbon dioxide to attempt to produce useful products. The process and system of the present invention uses commercially available gasification technology combined with fuel cells to generate electricity at high efficiency. This is accomplished by taking advantage of a very unique property of fuel cells—namely, the two anodic and cathodic reactions are separated by an electronically conducting membrane that keeps the product gases separate. In this way, a combustible feed gas can be fully oxidized in the first half-cell of the fuel cell without being commingled with the final products of the air in the second half-cell electrode, i.e., $N_2$. For example, in coal gasification, synthesis gas is formed consisting predominantly of hydrogen and carbon monoxide. This synthesis gas is fed into the first half-cell, i.e., the anode or negative terminal side, of the fuel cell, such as the solid oxide or molten carbonate types, where it is oxidized to water and carbon dioxide. These gases are not diluted by the typical nitrogen from combustion air used on the second or remaining half-cell, i.e., the cathode side or positive terminal, of the fuel side. Nitrogen and combustion gases are commingled when combustion air is used in boilers or furnaces. Thus, in the fuel cell, the synthesis gas (syngas) is oxidized without being combusted with air and without being diluted by other gases. The fuel cell-produced water and carbon dioxide are simply separated from each other by condensing the liquid water and allowing the carbon dioxide to return to the gasifier. The carbon dioxide being injected into the high temperature gasifier undergoes a reaction with the high temperature carbonaceous feed to form more carbon monoxide, repeating the cycle.

By means of the present process and system, the carbon dioxide in the fuel cell is easily kept separate from the air side and any nitrogen. This carbon dioxide can be recycled back to the gasifier in nearly pure form. Likewise water in pure form can be recycled as well in different amounts under gasifier control system requirements to maintain the ideal hydrogen to carbon monoxide ratio of in the range of about 1.75 to about 2.25. This helps maintain a high hydrogen content in the gasifier so that the gasifier-produced syngas can be used downstream in a chemical reactor such as a Fischer-Tropsch reaction system for the production of a variety of useful chemicals ranging from methanol to paraffin waxes. These in turn are used to make useful chemicals such as naphtha, gas oil, and kerosine. Thus, the carbon monoxide is used to produce useful chemicals instead of discarding the valuable carbon source in the carbon dioxide. The carbon balance of the plant is maintained such that the mass of carbon input in the waste feed is equal to the carbon mass leaving the plant as valuable hydrocarbon products not carbon dioxide.

What has been achieved is a chemical plant merged with a power plant that produces useful hydrocarbon products, high efficiency electric power without any carbon dioxide or other greenhouse gas emissions. And, most importantly gasification is much more flexible than a refinery or a coal boiler, since a wide variety of waste streams can be used as the feed material. This solves two serious problems.

The process can be used in an electric power producing plant using fossil fuels such as carbonaceous feedstocks including coal, hydrocarbon oil, natural gas, oil shale, and petroleum coke as well as in petroleum refinery and a petrochemical plants. Other carbonaceous materials such as waste oil, hazardous waste, medical waste, and mixtures thereof can be used as the feedstock to the gasification unit of the present invention.

DESCRIPTION OF THE DRAWING

Advantages of the present invention will become apparent to those skilled in the art from the following description and accompanying drawings in which.

DETAILED DESCRIPTION OF THE INVENTION

Figure 1:
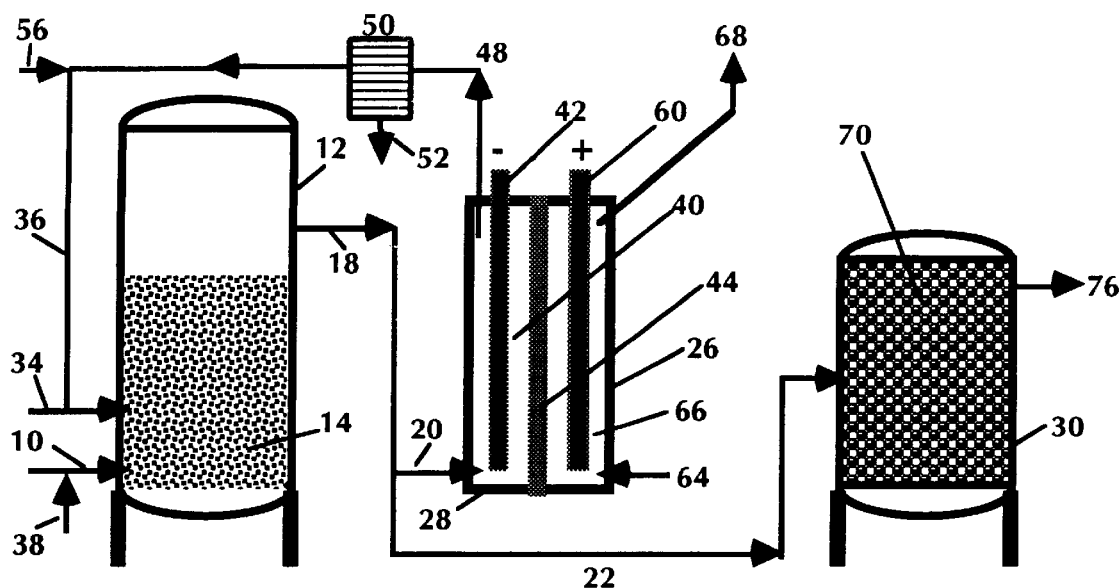
FIG. 1 is a schematic process flow diagram of a first embodiment of the process and system of the present invention.

A. First Embodiment of Process for Hydrogen Fuel Cell Energy without Production of Unwanted Greenhouse Gases FIG. 1 illustrates a specific embodiment of the process and system of the present invention in which a carbonaceous waste feed material is passed via line 10 to gasifier 12 containing catalytic bed 14 and is converted into synthesis gas at high temperature in the range of about 400° to about 600° C. (750–1100° F.). Preferably, a fluidized catalytic bed is used in gasifier 12. The syngas produced in gasifier 12 that leaves through flow line 18 is then split downstream into two flow lines 20 and 22. The syngas in flow line 20 enters fuel cell 26 at port 28. The second syngas stream is passed via flow line 22 to Fischer-Tropsch catalytic reactor 30.

One example of a gasification process and unit which can be used in the present invention is the Royal Dutch Shell gasifier, Amsterdam, The Netherlands; see L. O. M. Koenders, S. A. Posthuma, and P. L. Zuideveld, "*The Shell Gasification Process for Conversion of Heavy Residues to Hydrogen and Power*," in a paper presented at Gasification Technologies Conference, San Francisco, Calif., Oct. 2–4, 1996. Another example is the Texaco gasifier; see Corporate literature: "*Texaco Gasification Process for Solid Feedstocks,* " Texaco Development Corp., White Plains, N.Y. and "*Gasification: Reliable, Efficient, and Clean*," Texaco Global Gas and Power, White Plains, N.Y. The pertinent portions of these papers are incorporated by reference into this detailed description of the present invention. Another example of such gasification technology is the use of a steam reforming reactor system disclosed and claimed in U.S. Pat. No. 4,874,587, which is also incorporated herein by reference.

Near optimal operating conditions for petroleum coke feed in line 10 to gasifier 12 involve 6% oxygen fed through line 34, 12% $CO_2$ in line 36, and 15% $H_2O$ in line 38. These conditions allow for enough oxygen for gasifier 12 to maintain temperatures very close to about 900° C. (~1700° F.) and produce syngas comprising about 22% CO and about 45% $H_2$. These conditions vary somewhat with the H/C ratio of the feedstock, but the syngas $H_2$/CO ratio goal of about 1.75 to about 2.25 can be controlled by varying slightly the relative proportions of $O_2$, $CO_2$, and $H_2O$ fed to gasifier 10.

In fuel cell 26, the syngas feed passes upward through the electrolyte 40 around and through the porous catalytic anode electrode 42 wherein the gases are oxidized electrochemically. Membrane 44 is ionically conducting, but will not allow any of the gases or hydrocarbon species on either side of fuel cell 26 to pass through.

Examples of fuel cells that can accept syngas and are suitable for fuel cell 26 of the present invention include the Solid Oxide Fuel Cell manufactured by Westinghouse, Monroeville, Pennsylvania or by Technical Management Inc., Cleveland, Ohio and the Molten Carbonate Fuel Cell manufactured by Energy Research Corp., Danbury, Conn. The pertinent portion of the following references are incorporated by reference into this Detailed Description of the Invention: C. M. Caruana, "*Fuel Cells Poised to Provide Power*," Chem. Eng. Progr., pp. 11–21, September, 1996 and S. C. Singhal, "*Advanced in Tubular Solid Oxide Fuel Cell Technology*," Proceedings of the 4$^{th}$ International Symposium on Solid Oxide Fuel Cells, Pennington, N.J., Vol. 95–1, pp. 195–207 (1995).

The oxidized syngas, consisting essentially of hydrogen and carbon monoxide, leaves anode 42 of fuel cell 26 mostly as water vapor and carbon dioxide. This stream of oxidized syngas passes via line 48 into air-cooled condenser 50, where the water vapor is condensed into liquid water and is removed from the condenser bottoms via line 52 for reuse. Wastewater recovered from a municipal sewage system can be used in gasifier 12. However, all or a portion of the relatively pure water in line 52 can be sold or recycled and combined with the wastewater passing into gasifier 12 via line 38. The carbon dioxide gas is not condensed in condenser 50 and passes through into the condenser overhead as carbon dioxide gas to be fed back to the gasifier 12 via line 36. The carbon dioxide in high temperature gasifier 12 reacts therein with the carbonaceous feed material to form more syngas to further assist in the overall reaction. $CO_2$ or other greenhouse gases can be passed into gasifier 12 via line 56 to maintain the desired H/C ratio of the feedstock To complete the description of FIG. 1, it is noted that the other half-cell of fuel cell 26 involves air reduction on cathode 60. This standard air electrode allows the entering oxygen-containing gas in line 64, typically air, to pass upward through the air electrolyte 66 around and through electrode 60. The inert components of the air stream, consisting mostly of nitrogen, pass through the cathode half-cell and are removed via exit stream 68. Although more expensive, the cathode half-cell can also use pure oxygen instead of air to achieve higher efficiencies and more heat production. The fuel cell produces substantial electrical power ranging from 4 to 9 kilowatts per standard cubic foot per minute of hydrogen feed.

In the Fischer-Tropsch catalytic reactor 30, the syngas in line 22 is reacted over a catalyst 70 to form higher boiling hydrocarbons, such as waxes or other useful hydrocarbon products recovered in line 76. These waxes, for example, can form a feedstock to the Shell Middle Distillates Synthesis where they are reacted to form naphtha, fuel gas, and kerosine, which are all valuable chemical products; see J. Eilers, S. A. Posthuma, and S. T. Sie, "The Shell Middle Distillate Synthesis Process (SMDS), " Catalysis Letter, 7, pp. 253–270 (1990). The pertinent portions of this paper is incorporated by reference into this Detailed Description of the Invention.

Thus, overall the carbon mass entering the feed via line 10 leaves as carbon mass in the form of useful hydrocarbon products which are recovered via line 76, thus avoiding the release of carbon dioxide when a hydrocarbon feedstock is gasified. There is no expensive and troublesome alkali stripper to recover carbon dioxide from stack gases, as would be the case in a normal combustion/steam-turbine power plant configuration.

Figure 2:
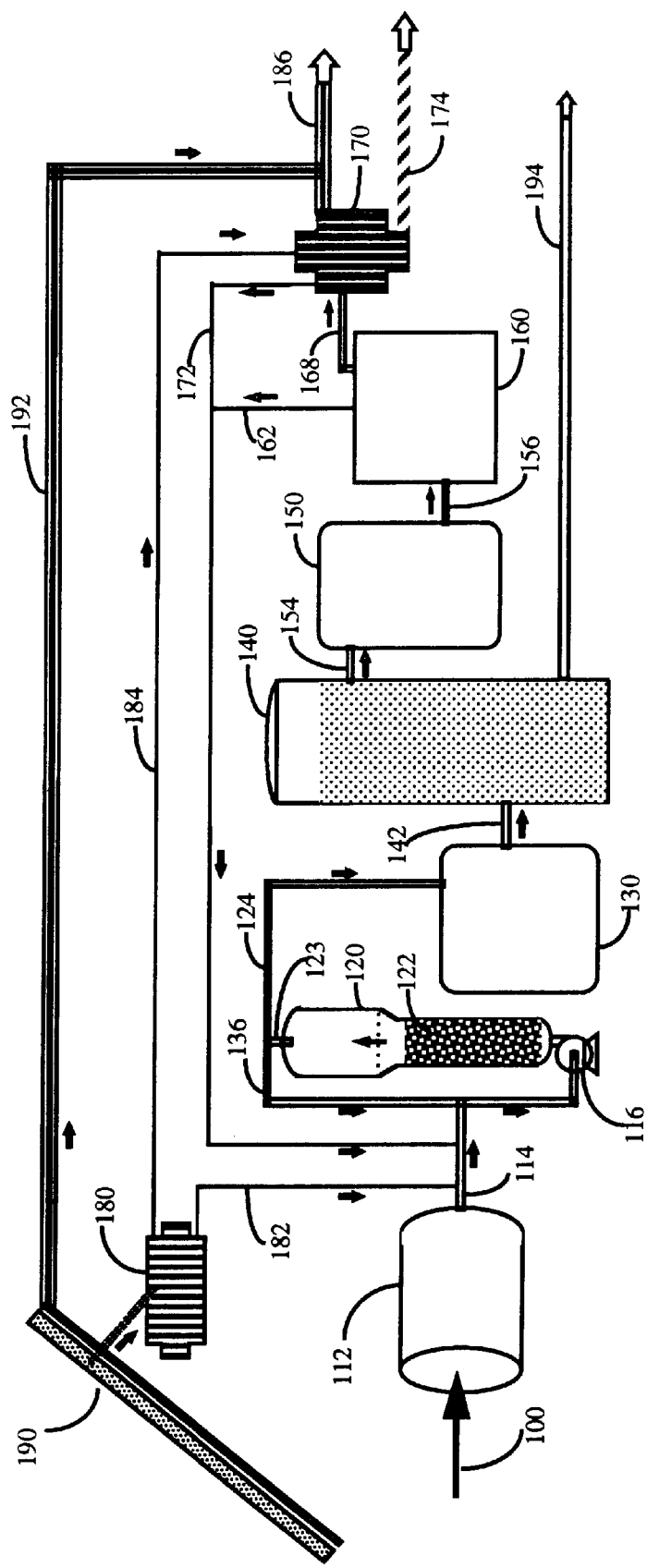
FIG. 2 is a schematic process flow diagram of a second embodiment of the process and system of the present invention.

B. Second Embodiment of Process for Solar-Methanol Fuel Cell Energy without Production of Unwanted Greenhouse Gases The process and system of the present invention makes possible the production of methanol by reacting the recycled carbon dioxide with electrochemically-produced hydrogen to produce a "balanced" syngas that is optimum for methanol production. The proper ratio of hydrogen/carbon monoxide=2.00 in a "balanced" syngas for such production. FIG. 2 illustrates the embodiment in which a solar regeneration fuel cell system converts solar-produced hydrogen gas into methanol that is safer to store for use in fuel cells to make electricity at night or when cloudy weather conditions occur. The second embodiment also uses a rotary waste feeder steam-reforming system where superheated steam and hydrogen react with organic waste to form syngas plus light hydrocarbons. This gas output from the rotary feeder is sent to the high temperature steam reformer where fairly pure "balanced" syngas is produced.

The second embodiment is a great improvement over the solar-regeneration system proposed by NASA (G. E. Voecks, et al. Jet Propulsion Laboratory, Warshay, M. et al. NASA Lewis Research Center, Edwards, II.S. et al., Navel Air Warfare Center, "Operation of the 25 kW NASA Lewis Research Center Solar Regenerative Fuel Cell Testbed Facility," Paper #97295, International Energy Conversion Engineering Conference, Proceedings, Vol. 3, 1999). The latter system requires that hydrogen gas be stored to supply the fuel cells. Hydrogen storage in occupied buildings or residences in the private sector is not acceptable from a present day safety standpoint. The methanol that is produced by a small, automated methanol synthesis plant is roughly a 50% methanol/water mixture. This mixture has the ideal safety feature that it is not flammable at room temperature even in the presence of an open flame and excess air. This 50% methanol mixture is also optimum for feeding to the fuel cell system shown in FIG. 2. Integral with the fuel cell of the second embodiment is a low-temperature reformer and selective oxidizer. This fuel cell system uses the commercial PEM membrane cell that is being used in early developmental fuel cell automobiles (i.e. Daimler-Benz, et al.) and buses (Georgetown University). The individual fuel cells can be purchased in 50 or 100 kW sizes.

The solar methanol fuel cell system shown in FIG. 2 has been designed for a demonstration installation in the East St. Louis Solar Cluster Village. The Village will involve a grouping of 50 solar-rooted residences surrounding a recreation center that also houses the methanol synthesis plant, methanol storage, and fuel cells for electric power production. The total system for the Village provides a nearly energy self-sufficient system which includes the use of solar energy and waste input in the form of household garbage. When solar energy is not available, the stored methanol drives the fuel cell to produce electricity for the housing complex and also the small electroyzer to produce the hydrogen needed to produce the "balanced" gas for the methanol synthesis plant. The excess methanol supply can be used for methanol fuel cell cars and buses for the residents of this solar village. This solar methanol fuel system of the second embodiment of the present invention can be used in remote areas or developing foreign countries that do not have a utility infrastructure.

Referring now to FIG. 2, the solid carbonaceous waste is passed via line 100 into rotary waste feeder 112 to convert the waste to a gas. The gas output from feeder 112 is sent via feed line 114 and pump 116 to high temperature steam reformer 120 containing fluidized catalytic bed 122. The waste gas is converted in reformer 120 to balanced syngas at temperatures in the range of about 400° and about 700° C. The balanced syngas is passed from outlet 123 through line 124 to methanol synthesis plant 130. A portion of the syngas is recycled to feed line 114 through line 136 to maintain minimum fluidization velocity. The methanol recovered from methanol plant 130 is passed to methanol storage tank 140 via line 142. Methanol from tank 140 is converted to syngas in low temperature steam reformer 150 after passing via line 154. The syngas is passed via line 156 to selective oxidation catalyst heat exchanger 160 to convert the CO to $CO_2$ which is recycled through line 162 to feed line 114. The hydrogen is in fluid communication via line 168 with the first half-cell of a currently commercially available PEM fuel cell 170. The exit gas from the first half-cell consisting mostly of water vapor passes through line 172 to be recycled to feed line 114 with the $CO_2$ in line 162. Electrolyzer 180 energized with the electricity 174 generated in fuel cell 170 and from solar panels 190 decomposes water into hydrogen and oxygen. The hydrogen is fed via line 182 to feed line 114 to assure that a balanced syngas is produced and passed to methanol plant 130. The oxygen from electrolyzer 180 passes via line 184 to the second half-cell of fuel cell 170 to serve as the optimum oxygen-containing gas for the fuel cell cathode for the production of electricity 174 and thermal energy 186. Thermal energy 192 that is also generated from solar PV (polyvinyl) panels 190 is combined with thermal energy 186 generated by fuel cell 170 to complete the energy balance of the second embodiment. Any excess thermal energy 186 can be sold. The excess methanol from tank 150 in line 194 can be used as a fuel source as described above.

Figure 3:
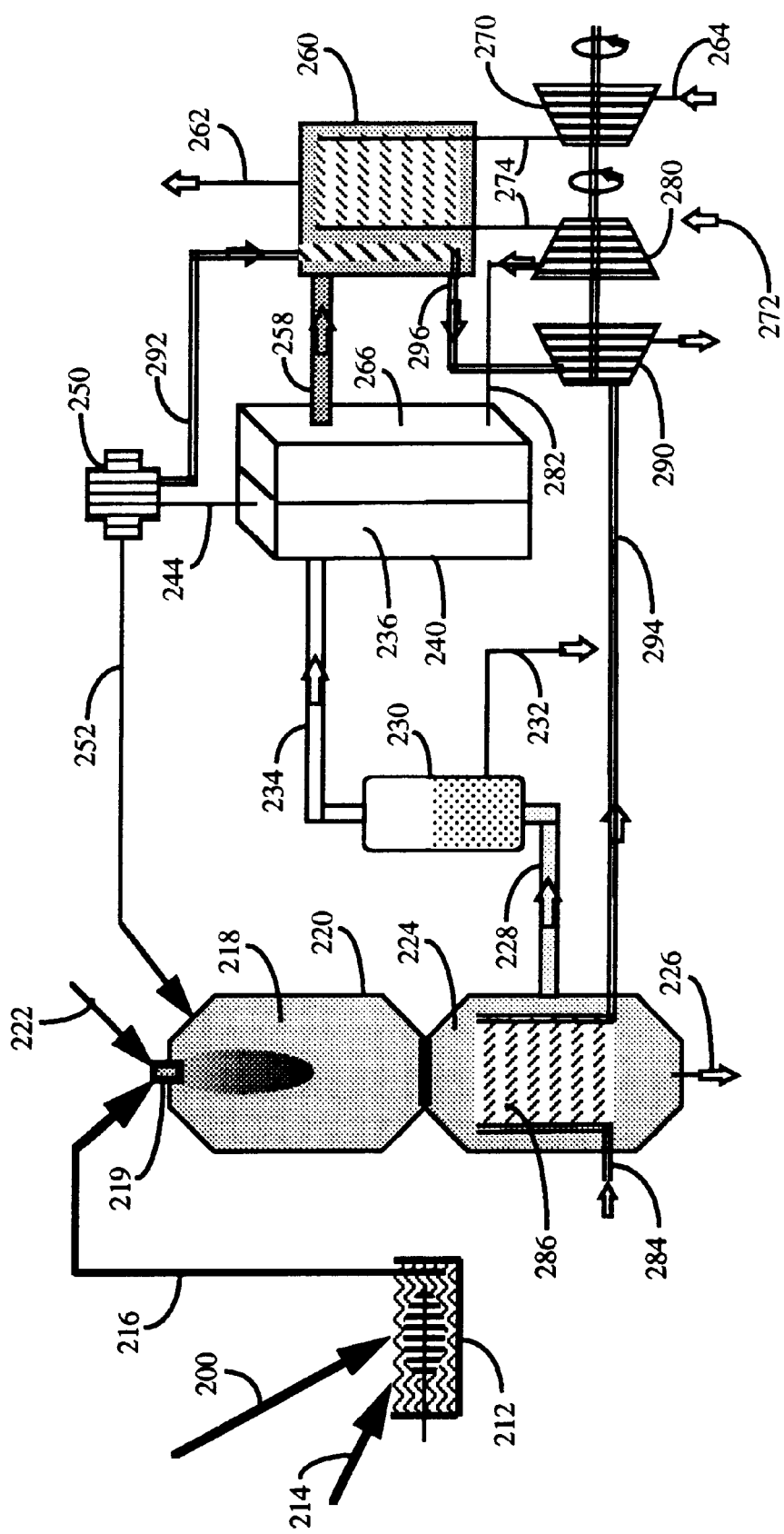
FIG. 3 is a schematic process flow diagram of a third embodiment of the process and system of the present invention.

C. Third Embodiment of Process for Integrated Gasification Fuel Cell Combined Cycle without Production of Unwanted Greenhouse Gases The third embodiment of the process and system of the present invention involves a larger scale system for a small power plant that uses a combination of coal and waste as co-feed. FIG. 3 illustrates the embodiment in which a high temperature solid oxide fuel cell (SOFC) is used that will accept the syngas produced in the gasification unit or gasifier. The $CO_2$ produced in the fuel cell is not significantly contaminated with air and therefore can be recycled.

It is the combined cycle integration of the SOFC fuel cell with the triple turbine train that raises the efficiency as a power plant to high values from 68% to 74%; see S. C. Singhal, "Advances in Tubular Solid Oxide Fuel Cell Technology," Proceedings of the $4^{th}$ International Symposium on Solid Oxide Fuel Cells, Pennington, N.J., Vol. 95–1, 195–207 (1995); and W. I. Lundberg, "Solid Oxide Fuel Cell/GasTurbine Power Plant Cycles and Performance Estimates," Power-Gen International '96, Orlando, Fla., (Dec. 4–6, 1996). The SOFC air feed is pressurized by one of the turbine-driven compressors and then heated in the "Heat Recuperator" that recovers waste heat from the SOFC. This heated air is then expanded to generate power in the second turbine stage. And finally, a portion of the steam generated from gasifier together from steam generated in the SOFC are used to power the third stage of the steam turbine. The purpose of the water condenser is to accept the SOFC gas outlet containing steam and $CO_2$ and to separate the water to make steam for the steam turbine and to recycle the $CO_2$ for reuse in the gasifier. Although this water condenser is symbolically shown as a single simplified unit, there are heat exchangers as part of this unit to efficiently condense the water and reboil the separated water before it is passed to the gas-phase "Heat Recuperator" to produce the high temperature steam that feeds the steam turbine.

The low pressure steam discharge from the steam turbines that are an integral part of the fuel cell package can be provided to offsite users that are adjacent to the power plant, such as businesses with lower temperature thermal needs for their operations. This scheme will eliminate the need for large cooling towers with steam plume discharges. This is a significant cost savings and an environmental credit.

The arrangement of the electrolyzers in FIG. 2 receiving power from the fuel cell output provides the ability for the plant to load-follow while keeping the coal feed and the steam-reformer operating at near constant throughput. The amount of plant electrical output can be diverted in varying amounts to operate the electrolyzers so that excess hydrogen and oxygen can be produced and stored. During peak power demands, a modest increase in fuel cell output power can be generated from this extra hydrogen fed to the fuel cells.

In the third embodiment shown in FIG. 3, the solid carbonaceous waste in the form of coal or solid waste is passed via line 200 into wet grinder 212 and combined with water or liquid waste via line 214 to form a slurry of the proper consistency The slurry from feeder 212 is sent via feed line 216 to inlet 219 of first stage 218 of a two-stage gasifier 220. Oxygen through line 222 is combined with the slurry in first stage 218. The slurry is converted in the second stage 224 of gasifier 220 to syngas at temperatures in the range of about 800° and 1600° C. A slag by-product is recovered from the bottom of second stage 224 via line 226. The syngas from second stage 224 is passed via line 228 to sulfur removal unit 230. A carbon disulfide by-product is recovered from the bottom of unit 230 via line 232. The substantially sulfur-free syngas from unit 230 is passed through line 234 to the first half-cell 236 of SOFC fuel cell 240. The exit gas from first half-cell 236 consisting mostly of steam and carbon dioxide passes through line 244 to water condenser 250. The $CO_2$ is recycled via line 252 to first stage 218 of gasifier 220. The nitrogen waste heat 258 recovered in fuel cell 240 is contained in heat recuperator 260. The nitrogen from recuperator exits to the atmosphere via line 262. The air via line 264 for second stage 266 of fuel cell 240 is pressured by the compressor first stage 270 of gas turbine plant 272 and passes through heat recuperator 260 via line 274. The heated air from recuperator 260 is expanded in the second turbine stage 280 of turbine plant 272 before input into fuel cell 240 via line 282. Water in line 284 is converted to steam in second stage 224 of waste heat boiler 286 within gasifier 220. Water condensed in line 292 from condenser 250 is converted to steam in heat recuperator 260. Steam in line 294 from second stage 224 of gasifier 220 and steam in line 296 from recuperator 260 are used to power the third turbine stage 290 of turbine plant 272.

Further, without departing from the spirit and scope of this invention, one of ordinary skill in the art can make various other embodiments and aspects of the process and system of the present invention to adapt it to specific usages and conditions. As such, these changes and modifications are properly, equitably, and intended to be, within the full range of equivalents of the following claims.

What is claimed is:

1. A process for convering carbonaceous feedstock into energy without the production of greenhouse gas emissions comprising:
   (a) converting a carbonaceous feedstock selected from the group consisting of coal, hydrocarbon oil, natural gas, petroleum coke, oil shale, carbonaceous-containing waste oil, carbonaceous-containing hazardous waste, carbonaceous-containing medical waste, and mixtures thereof and a greenhouse gas stream in a gasification unit to synthesis gas comprising carbon monoxide and hydrogen;
   (b) electrochemically oxidizing at least a portion of said synthesis gas from said gasification unit in a first half-cell of a fuel cell to a first half-cell exit comprising carbon dioxide and water;
   (c) recovering the carbon dioxide from said first half-cell exit gas to serve as at least a portion of said greenhouse gas stream in step (a); and
   (d) electrochemically reducing an oxygen-containing gas in a second half-cell of said fuel cell completing the circuit and resulting in the production of electrical energy.

2. The process of claim 1 wherein said greenhouse gas stream is carbon dioxide.

3. The process of claim 1 wherein the production of electrical energy takes place in an electric power producing fossil fuel plant.

4. The process of claim 1 wherein the production of electrical energy takes place in a petroleum refinery.

5. The process of claim 1 wherein the production of electrical energy takes place in a petrochemical plant.

6. The process of claim 1 wherein said gasification unit contains a fluidized catalytic bed and operates at temperatures in the range of about 400° to about 700° C. (750–1300° F.).

7. The process of claim 1 wherein a portion of said synthesis gas from said gasification unit is converted in a chemical reactor into useful hydrocarbon products.

8. The process of claim 7 wherein said chemical reactor is a Fischer-Tropsch reactor.

9. The process of claim 8 wherein a major portion of the water is condensed from said first half-cell exit gas using a condenser.

10. The process of claim 9 wherein hydrogen and at least a portion of the condensed water is passed to said gasification unit in an amount to adjust the hydrogen to carbon ratio of the combined carbonaceous feedstock and greenhouse gas stream is sufficient to result in a synthesis gas having an optimum ratio for the Fischer-Tropsch reactor.

11. The process of claim 10 wherein said synthesis gas has a hydrogen to carbon ratio in the range of about 1.75 to about 2.25.

12. The process of claim 8 wherein the amount of greenhouse gas stream is adjusted in step (a) so that the combined carbonaceous feedstock and greenhouse gas stream to said gasification unit has a hydrogen to carbon monoxide ratio in the range of about 1.75 to about 2.25.

13. The process of claim 1 wherein the oxygen-containing gas in step (d) is air and the nitrogen that remains after the electrical reduction is exited into the atmosphere.

14. The process of claim 1 wherein said first half-cell of said fuel cell contains an electrolyte surrounding a porous catalytic anode electrode.

15. The process of claim 14 wherein said second half-cell of said fuel cell contains an air electrolyte surrounding a catalytic cathode electrode.

16. The process of claim 15 wherein said first and second half-cells of said fuel cell are separated by an ionically conducting membrane that will not allow passage of components from the respective half-cells.

17. A system for converting carbonaceous feedstocks into energy without the production of greenhouse gas emissions which comprises:

(a) a gasification unit having an inlet for a carbonaceous feedstock selected from the group consisting of coal, hydrocarbon oil, natural gas, petroleum coke, oil shale, carbonaceous-containing waste oil, carbonaceous-containing hazardous waste, carbonaceous-containing medical waste, and mixtures thereof and a greenhouse gas stream, a catalyst for converting the combined feedstock into synthesis gas comprising carbon monoxide and hydrogen, and an outlet for the synthesis gas;

(b) a fuel cell for the production of electrical energy comprising a first half-cell having an inlet in fluid communication with the synthesis gas and an anode for electrochemically oxidizing synthesis gas into a first half-cell exit gas of carbon dioxide and water, a second half-cell having a cathode for electrochemically reducing an oxygen-containing gas, and a membrane separating said first and second half cells that will not allow passage of components from the respective half-cells; and (c) a passage means for passing the carbon dioxide from said first half-cell to serve as at least a portion of the greenhouse gas stream for said gasification unit.

18. The system of claim 17 wherein the greenhouse gas stream is carbon dioxide.

19. The system of claim 17 wherein said gasification unit contains a fluidized catalytic bed and operates at temperatures in the range of about 400° to about 700° C.

20. The system of claim 17 wherein a chemical reactor is in fluid communication with said gasification unit to convert a portion of said synthesis gas from said gasification unit into useful hydrocarbon products.

21. The system of claim 20 wherein said chemical reactor is a Fischer-Tropsch reactor.

22. The system of claim 21 wherein a condenser is used to condense a major portion of the water from said first half-cell exit gas.

23. The system of claim 22 wherein the hydrogen and at least a portion of the condensed water is passed to said gasification unit in an amount to adjust the hydrogen to carbon ratio of the combined carbonaceous feedstock and greenhouse gas stream is sufficient to result in a synthesis gas having an optimum ratio for the Fischer-Tropsch reactor.

24. The system of claim 23 wherein said synthesis gas has a hydrogen to carbon ratio in the range of about 1.75 to about 2.25.

25. The system of claim 21 wherein the amount of greenhouse gas stream is adjusted in step (a) so that the combined carbonaceous feedstock and greenhouse gas stream to said gasification unit has a hydrogen to carbon monoxide ratio in the range of about 1.75 to about 2.25.

26. The system of claim 17 wherein the oxygen-containing gas is air and the nitrogen that remains after the ionic reduction is exited into the atmosphere.

27. The system of claim 17 wherein said first half-cell of said fuel cell contains an electrolyte surrounding a porous catytic anode electrode.

28. The system of claim 27 wherein said second half-cell of said fuel cell contains an air electrolyte surrounding a catalytic cathode electrode.

29. A process for converting carbonaceous feedstocks into energy without the production of greenhouse gas emissions comprising:

(a) converting a carbonaceous-containing organic waste feedstock and a carbon dioxide gas stream in said reactor to synthesis gas comprising carbon monoxide and hydrogen in a high temperature steam reforming reactor operating at temperatures in the range of about 400° and about 700° C.;

(b) converting at least a portion of said synthesis gas from said reactor to methanol;

(c) electrochemically oxidizing said methanol directly in a first half-cell of a fuel cell to a fist half-cell exit gas comprising carbon dioxide and water;

(d) recovering the carbon dioxide from said first half-cell exit gas to serve as at least a portion of said carbon dioxide gas stream in step (a); and (e) electrochemically reducing an oxygen-containing gas in a second half-cell of said fuel cell resulting in the production of electrical energy.

30. The process of claim 29 wherein said fuel cell utilizes a pre-conversion means to convert methanol to hydrogen and carbon dioxide to permit hydrogen to feed said first half-cell of said fuel cell.

31. The process of claim 30 wherein said conversion means comprises a low temperature stream reformer operating at temperatures less than about 400° C. and a selective oxidizer and wherein the carbon dioxide from said selective oxidizer serves as a portion of said carbon dioxide gas stream in step (a) and the hydrogen from said selective oxidizer is electrochemically oxidized in said first half-cell.

32. The process of claim 29 wherein said electrical energy is used to service buildings equipped with solar panels during the night and cloudy daytime conditions.

33. The process of claim 32 wherein hydrogen is produced in an electrolyzer to produce a balanced gas for the production of methanol, said electrolyzer energized by said electrical energy.

34. The process of claim 33 wherein oxygen produced in said electrolyzer is recycled to said second half-cell to serve as at least a portion of said oxygen-containing gas.

35. The process of claim 32 wherein said organic waste feedstock is a carbonaceous-containing municipal garbage.

36. A process for converting carbonaceous feedstocks into energy without the production of greenhouse gas emissions comprising:
  (a) converting a carbonaceous-containing organic waste feedstock and a carbon dioxide gas stream in said reactor to synthesis gas comprising carbon monoxide and hydrogen in a high temperature steam reforming reactor operating at temperatures in the range of about 400° and about 700° C.;
  (b) converting at least a portion of said synthesis gas from said reactor to methanol;
  (c) electrochemically oxidizing said methanol directly in a first half-cell of a fuel cell to a first half-cell exit gas comprising carbon dioxide and water;
  (d) recovering the carbon dioxide from said first half-cell exit gas to serve as at least a portion of said carbon dioxide gas stream in step (a); and
  (e) electrochemically reducing an oxygen-containing gas in a second half-cell of said fuel cell resulting in the production of electrical energy.

37. The process of claim 36 wherein said fuel cell utilizes a pre-conversion means to convert methanol to hydrogen and carbon dioxide to permit hydrogen to feed said first half-cell of said fuel cell.

38. The process of claim 37 wherein said conversion means comprises a low temperature steam reformer operating at temperatures less that about 400° C. and a selective oxidizer and wherein the carbon dioxide from said selective oxidizer serves as a portion of said carbon dioxide gas stream in step (a) and the hydrogen from said selective oxidizer is electrochemically oxidized in said first half-cell.

39. The process of claim 36 wherein said electrical energy is used to service buildings equipped with solar panels during the night and cloudy daytime conditions.

40. The process of claim 39 wherein hydrogen is produced in an electrolyzer to produce a balanced gas for the production of methanol, said electrolyzer energized by said electrical energy.

41. The process of claim 40 wherein oxygen produced in said electrolyzer is recycled to said second half-cell to serve as at least a portion of said oxygen-containing gas.

42. The process of claim 39 wherein said organic waste feedstock is a carbonaceous-containing municipal garbage.

43. A process for converting carbonaceous feedstocks into energy without the production of greenhouse gas emissions comprising:
  (a) converting a carbonaceous feedstock and a carbon dioxide gas stream in a gasification unit to synthesis gas comprising carbon monoxide and hydrogen;
  (b) electrochemically oxidizing at least a portion of said synthesis gas from said gasification unit in a first half-cell of a solid oxide fuel cell to a first half-cell exit gas comprising carbon dioxide and water;
  (c) condensing water from said half-cell exit gas in a condenser and separating out the major portion of water from the carbon dioxide;
  (d) passing the carbon dioxide from said condenser to serve as at least a portion of said greenhouse gas stream in step (b);
  (e) recovering the carbon dioxide from said first half-cell exit gas to serve as at least a portion of said carbon dioxide gas steam in step (a); and
  (f) electrochemically reducing an oxygen-containing gas in a second half-cell of said fuel cell resulting in the production of electrical energy.

44. The process of claim 43 wherein said feedstock is selected from the group consisting of coal, oil shale, carbonaceous-containing solid waste and mixtures thereof combined with water or carbonaceous-containing liquid waste.

45. The process of claim 43 wherein heat given off in said fuel cell is recovered in a heat recuperator.

46. The process of claim 45 wherein boiler feed water is converted to high pressure steam in said gasification unit operating at temperatures in the range of about 400° and about 900° C. and used to drive the third of a three stage steam turbine.

47. The process of claim 44 wherein the oxygen-containing gas is heated in said heat recuperator, expanded to drive the second stage of said three stage steam turbine, and used in step (f).

48. The process of claim 43 wherein sulfur is removed from said synthesis gas from said gasification unit in a sulfur removal unit before being electrochemically oxidized in said fuel cell.

* * * * *

UNITED STATES PATENT AND TRADEMARK OFFICE
CERTIFICATE OF CORRECTION

PATENT NO. : 6,187,465                    Page 1 of 1
DATED : February 13, 2001
INVENTOR(S) : Terry R. Galloway It is certified that error appears in the above-identified patent and that said Letters Patent is hereby corrected as shown below:

At "Other Publications"    Publication No. 7, delete Psacoo" and insert therefor --Pascoo--
Column 6, line 19,    delete "solar-rooted and insert therefor --solar-roofed--.
Column 8, line 29,    delete "convering" and insert therefor —converting--.
Column 10, line 39,    delete "fist" and insert therefor --first--.
Column 12, line 21,    delete "steam" and insert therefor --stream--.
At 76, Address of the Inventor, delete "6810" and insert therefor --6801--.
At Page 2, lines 14 and 19,    delete "O1" and insert therefor --Oil--.
Column 5, line 62,    delete "Navel" and insert therefor --Naval--.
Column 6, line 27,    delete "electroyzer" and insert therefor --electrolyzer--.
Column 6, line line 66,    delete "(polyvinyl) and insert therefor --(photovoltaic)--.

Signed and Sealed this

Fifth Day of June, 2001

*Attest:*

NICHOLAS P. GODICI

*Attesting Officer*     *Acting Director of the United States Patent and Trademark Office*